(12) United States Patent
Langsdorf et al.

(10) Patent No.: US 8,158,225 B2
(45) Date of Patent: Apr. 17, 2012

(54) PRODUCTION FROM THE MELT OF A CONTAINER MADE FROM GLASS

(75) Inventors: Andreas Langsdorf, Ingelheim (DE); Juergen Thuerk, St. Gallen (CH); Aurel Kunz, Appenzell (CH); Ulrich Lange, Mainz (DE); Joachim Kuester, Erzhausen (DE); Bernd Loeffelbein, Saulheim (DE); Marcus Meinefeld, Coppenbruegge (DE); Uwe Rothhaar, Birkenheide (DE); Axel Ohlinger, Wiesbaden (DE)

(73) Assignee: Schott AG, Mainz (DE)

( * ) Notice: Subject to any disclaimer, the term of this patent is extended or adjusted under 35 U.S.C. 154(b) by 276 days.

(21) Appl. No.: 12/699,137

(22) Filed: Feb. 3, 2010

(65) Prior Publication Data

US 2010/0203269 A1 Aug. 12, 2010

(30) Foreign Application Priority Data

Feb. 6, 2009 (DE) .......................... 10 2009 008 689

(51) Int. Cl.
*A47G 19/22* (2006.01)
*B28B 11/00* (2006.01)
*B28B 21/00* (2006.01)
*B28B 21/72* (2006.01)
*B28B 23/08* (2006.01)
*B29D 22/00* (2006.01)
*B29D 23/00* (2006.01)
*B32B 1/08* (2006.01)
*F16L 9/10* (2006.01)

(52) U.S. Cl. ............... 428/34.4; 428/426; 65/66; 65/68; 65/71; 65/72; 65/109; 65/302

(58) Field of Classification Search ................. 428/34.4, 428/426; 65/35, 66, 68, 71, 72, 109, 302
See application file for complete search history.

(56) References Cited

U.S. PATENT DOCUMENTS 3,839,003 A * 10/1974 Dockerty et al. ................. 65/71

FOREIGN PATENT DOCUMENTS

DE 1 241 057 12/1967
GB 572984 11/1945

* cited by examiner

Primary Examiner — Michael C Miggins
(74) Attorney, Agent, or Firm — Harness, Dickey & Pierce, P.L.C.

(57) ABSTRACT

The invention proposes a process for the production of a container made from glass, in the form of a hollow body open on both ends for pharmaceutical and medical applications, in particular in the form of a syringe barrel, where a glass drop (14) is dispensed from a melting unit, is placed into a mold (12) that is driven to rotate, and is formed by the effect of the centrifugal force, the mold being driven at a rotational speed of at least 5000 rpm, preferably approximately 50000 rpm.

20 Claims, 1 Drawing Sheet

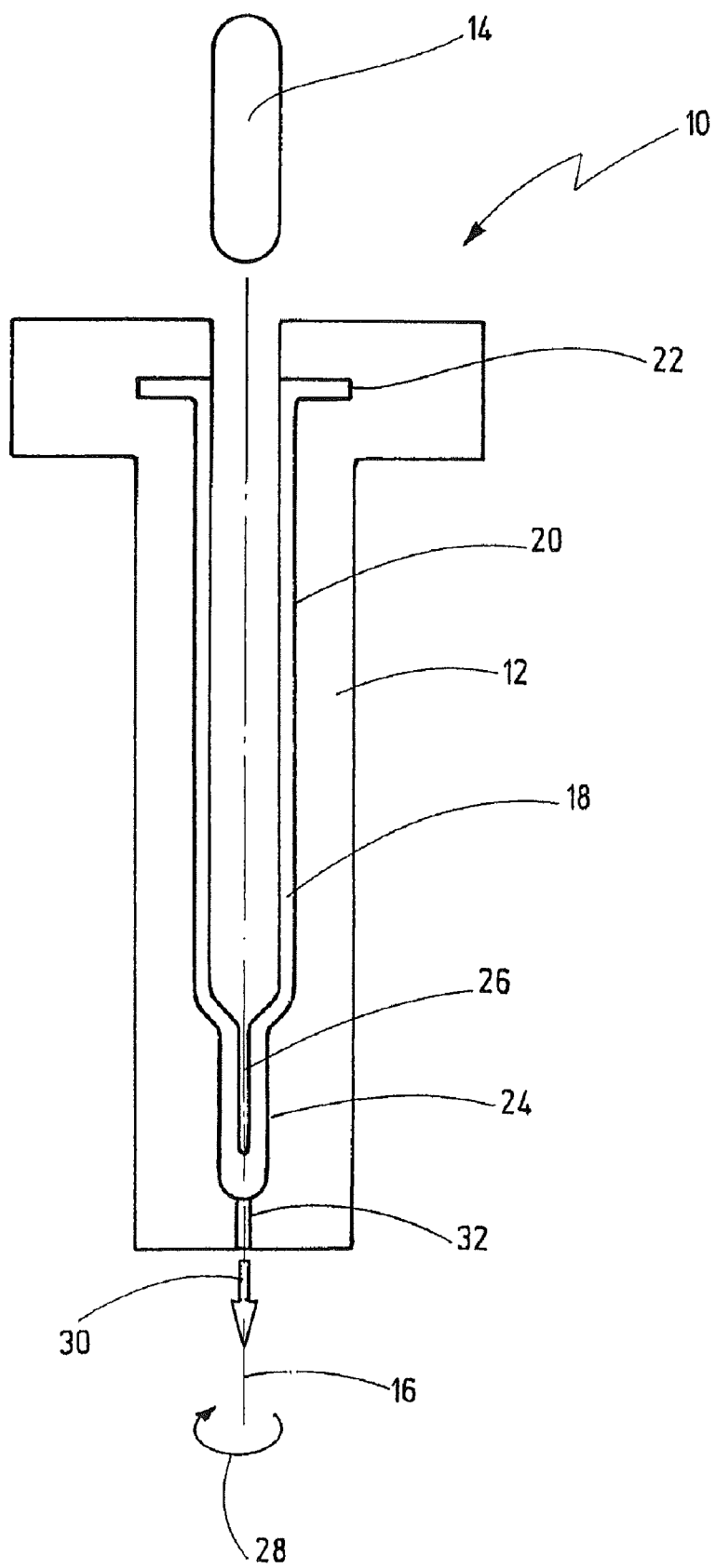

PRODUCTION FROM THE MELT OF A CONTAINER MADE FROM GLASS

RELATED APPLICATION

This application claims priority to German Application No. 10 2009 008 689.7, filed Feb. 6, 2009, the entire contents of which are incorporated herein by reference.

BACKGROUND OF THE INVENTION

The present invention relates to a process for the production, directly from the melt, of a container made from glass, in particular a container in the form of a hollow body open on both ends for pharmaceutical and medical applications, in particular in the form of a syringe barrel.

Pharmaceutical containers normally are made from tubes or by blow forming directly from the melt. Due to lower variations in thickness, containers made from tubes can be made with thinner wall thicknesses and with close wall thickness tolerances. As a result of the wall thickness problem, syringe barrels for pharmaceutical or medical applications are produced exclusively from tubes.

GB 572 984 proposes to form a syringe with an at least closely toleranced inner diameter by blowing using a blowpipe, and snap back forming on a mandrel, but this is a process where more than 50% of the glass is lost and has to be discarded, so that this process hardly lends itself to industrialization.

DE 1 241 057 A1 further discloses a production process for ampoules for pharmaceutical and medical purposes directly from the melt, where the glass quantity required is initially drawn directly from the glass melt using a blowpipe and is then blown, with the blowpipe rotating, into a two-part mold that is applied from the outside. Thereafter, the ampoule is separated from the blowpipe by a burner. According to another method of producing ampoules directly from the glass bath, the bottom of the melt pan comprises an opening through which the liquid glass is pressed out by a plunger from the top toward the bottom. The glass drop is cut off by automatically operated shears and drops into a funnel-like recess where it is retained either by vacuum or by a ring placed on top of the drop. A hollow mandrel, which is introduced automatically, then blows up the parison to form a hollow body.

This and other variants of a production process for ampoules do not guarantee satisfactory thickness tolerances for the production of syringe barrels.

Accordingly, a production process based on preformed glass tubes has become generally accepted in the art for the production of syringe barrels.

The drawbacks of that method are relatively high production costs and the fact that local reheating of the glass tube during the reforming process will result in depletion of certain components due to evaporation. For example, syringe barrels made from glass tubes normally will be depleted of boron and sodium in different surface areas when the containers are produced from borosilicate glasses. In addition, intermediate packaging and transportation to the reforming station of the tubes used as a starting material require additional measures if undesirable contamination or damage to the tubes is to be prevented.

As a rule, so-called "Type I glasses", sometimes also described as "neutral glasses", are used for the production of pharmaceutical or medical containers of the kind of interest in the present case. The glasses in question, as a rule borosilicate glasses, have a Class I resistance to water according to DIN ISO 719 and a Class I resistance to acids according to DIN 12116.

SUMMARY OF THE INVENTION

In view of this it is a first object of the present invention to disclose a process for the production of containers made from glass, in particular in the form of hollow bodies open on both ends for medical or pharmaceutical applications.

It is a second object of the present invention to disclose a process for the production of containers which is suited especially for the production of syringe barrels for medical and pharmaceutical purposes.

It is a third object of the present invention to disclose a process for the production of containers which allows production of the containers directly from the glass melt while ensuring that the tolerances required for such containers are observed.

According to the invention these and other objects are achieved by a process for the production of a container, preferably a container in the form of a hollow body open on both ends for pharmaceutical or medical applications, from glass, preferably from a borosilicate glass, where a glass drop is dispensed from a melting unit, is placed into a mold that is driven to rotate, and is formed by the effect of the centrifugal force, the mold being driven at a rotational speed of at least 5000 rpm, preferably at least 10000 rpm, more preferably at least 20000 rpm, more preferably at least 30000 rpm, most preferably at least 40000 rpm.

It has been found that using rotational speeds that high it is possible to reliably form even containers with small dimensions so that the required tolerances are observed.

In the case of such high spinning speeds it is of advantage to use unsplit centrifugal molds, for reasons of mechanical stability and balancing. It has been found that the molded glass parts can still be deformed, even from a mold with only a very slight deforming cone, or from a mold of purely cylindrical shape over its main part, provided the design is selected to allow for thermal expansion.

According to a preferred further development of the invention, the glass drop is drawn into the mold assisted by a vacuum.

That feature provides the advantage that defined filling of the mold and defined distribution of the wall thicknesses can be supported by vacuum specifically in those areas that will not be filled, or not be filled uniformly enough, by centrifugal force alone.

According to another embodiment, the cone area is cooled in order to stabilize the geometry of the cone formed by the vacuum in the course of the spinning process.

According to another embodiment of the process according to the invention, the container is produced from a borosilicate glass, preferably from a Type I glass, and the glass drop is fed into the mold with a temperature of at least 1600° C., preferably at least 1700° C., more preferably at least 1750° C.

Feeding the glass drop into the mold with a temperature that high has the result that even small and thin containers can be produced with a uniform wall thickness. The spinning speeds can still be kept within a relatively low range.

The viscosity of the glass drop being fed into the mold preferably is less than $10^3$ dPas, preferably less than $10^2$ dPas.

Such a low viscosity results in uniform distribution and perfect filling of the mold with small thickness tolerances.

Preferably, the glass drop is dispensed by a needle feeder without shears.

That feature provides the advantage that shear marks are avoided so that more uniform filling of the mold can be achieved.

According to another feature of the invention, an unsplit mold is used whose wall, in a substantially cylindrical portion, is inclined by less than 5 μm per 1 mm of its length relative to the axis of rotation.

Preferably, one even uses a mold whose wall in the substantially cylindrical portion has a completely cylindrical shape, i.e. whose wall is inclined by 0 μm relative to the axis of rotation.

While as a rule the art regards a slight conicity as being necessary to obtain good deforming properties, it has been found that satisfactorily safe deforming is possible even in the presence of a very slight conicity or even zero conicity.

According to a further feature of the invention, no lubricant is applied between the glass and the mold.

That feature contributes toward reducing the risk of contamination. In addition, improved molding accuracy is achieved.

Preferably, the glass drop is introduced into the mold with the mold already rotating at full speed.

This provides the advantage that the glass will enter the mold in a condition still sufficiently liquid to ensure uniform shaping during the spinning process, even in case the drops are very small.

In principle, the container can be produced in the most diverse forms, as desired, although according to a preferred embodiment the container has an outwardly open flange on its one end and a so-called cone on its other end.

The term "cone" as used in the present application is meant to describe a portion having a diameter smaller than that of the medium cylindrical portion. The form of the cone depends on the particular product. As a rule, the cone tapers toward its end, although it may also have thicker spots in that region.

In a preferred further development of that embodiment, the container is produced with a full-length cone channel in its cone.

According to a further feature of the invention, the cone, after having cooled down, is cut off at its outer end to open up the cone channel.

This step leads to a simple way of producing a cone channel that opens to the outside.

The container for pharmaceutical and medical applications according to the invention consists of a borosilicate glass, and comprises a cylindrical portion having a wall thickness tolerance of maximally ±0.2 mm, and the boron content of the container, at all its surfaces, drops by less than 60%, preferably less than 40%, more preferably less than 20% relative to its nominal value.

Further, the sodium content of the container preferably also drops at all surfaces by less than 30%, preferably less than 20%, relative to its nominal value.

Being produced directly from the glass melt without any intermediate steps, a container produced according to the invention shows only little evaporation losses of its easily volatile components, in particular of boron and sodium.

Accordingly, the process results in a more uniform and higher quality compared with conventional containers produced from preformed tubes.

The container according to the invention preferably is provided at its end with a cone of smaller diameter, compared with the diameter of the medium cylindrical portion.

The container according to the invention may also be produced in very small dimensions and may accordingly have a total glass mass of maximally 15 g, in particular maximally 10 g, in particular maximally 5 g.

Correspondingly, the volume of the container may be very small, i.e. maximally 15 ml, in particular maximally 10 ml, or maximally 5 ml.

Finally, the container according to the invention may have an overall height and an overall diameter such that the overall height is equal to 1.5 times the value of the overall diameter.

Finally, the container according to the invention can be produced with a very thin wall thickness, which may be smaller than 1.5 mm, in particular smaller than 1.3 mm, or even smaller than 1.1 mm in the cylindrical portion.

Still, the wall thickness tolerance will be maximally ±0.2 mm, preferably ±0.1 mm.

It is understood that the features of the invention mentioned above and those yet to be explained below can be used not only in the respective combination indicated, but also in other combinations or in isolation, without leaving the scope of the invention.

BRIEF DESCRIPTION OF THE DRAWING

Further features and advantages of the invention will become apparent from the description that follows of a preferred embodiment, with reference to the drawing. In the drawing:

The single FIG. 1 shows a simplified representation of a device for carrying out the process according to the invention.

DETAILED DESCRIPTION OF THE PREFERRED EMBODIMENTS

In FIG. 1 a centrifugal device is indicated in total by reference numeral 10.

The device 10 comprises a mold 12 in which is provided a recess 18 that conforms with the negative shape of the container to be produced.

The mold 12 is adapted for being driven at a very high rotational speed and may be driven at speeds of up to at least 50000 rpm, preferably however of up to 80000 rpm or even of up to 100000 rpm.

A glass drop 14 of the desired mass is dispensed from a melting unit, preferably using a needle feeder without shears, and drops directly into the mold 12, as shown in FIG. 1.

The glass drop 14 so fed has a very low viscosity, of preferably less than $10^3$ dPas, preferably less than $10^2$ dPas. When a borosilicate glass, preferably a Type I glass is used, the glass drop being fed into the mold has a temperature of at least 1600° C., preferably of at least 1700° C., more preferably of at least 1750° C.

EXAMPLE

A syringe barrel produced from FIOLAX® Type I glass has a standard volume of 1 ml, a syringe diameter of 8.15 mm and a length of 64 mm, and a wall thickness of 0.9 mm in the cylindrical portion, with an integrally formed cone with cone channel 26 and a flange 22 on its opposite end.

A Type I glass, also known as neutral glass, is a glass having a Class 1 resistance to water according to DIN ISO 719 and a Class 1 resistance to acids according to DIN 12116.

FIOLAX® is a borosilicate glass produced and marketed by Applicant that is used in particular for pharmaceutical applications. The characteristics of FIOLAX® are summarized in Table 1.

The glass being fed into the mold 12 has a viscosity of between $10^2$ and $10^3$ dPas. The temperature of the mold is closely below the sticking point, i.e. a temperature lower than the temperature at a viscosity of $10^{10}$ dPas.

Shaping of the cone 24 and of the cone channel 26 is specifically assisted by application of a vacuum to the cone 24 via a channel 32, as indicated by arrow 30 in FIG. 1. The vacuum is as high as possible in this case and may be in the range of approximately −0.9 bar, for example.

The centrifugal mold is additionally cooled in the cone area in order to stabilize the shape of the cone during the spinning process.

TABLE 1

FIOLAX ® Data

Chemical composition (Main components in % by weight)

| $SiO_2$ | $B_2O_3$ | $Al_2O_3$ | $Na_2O$ | CaO |
|---|---|---|---|---|
| 75 | 10.5 | 5 | 7 | 1.5 |

Resistance to water

| According to DIN ISO 719 | Class HGB 1 |
|---|---|

Resistance to acids

| According to DIN 12116 | Class S1 |
|---|---|

Coefficient of thermal expansion

| $\alpha$ (20° C.) | $4.9 \cdot 10^{-6}$/K |
|---|---|
| Transformation temperature $T_g$ | 565° C. |

Temperature of the glass at the viscosities $\eta$ (in dPa · s)

| $10^{13}$ (Upper cooling temperature) | 565° C. |
|---|---|
| $10^{7,6}$ (Softening temperature) | 785° C. |
| $10^4$ (Processing temperature) | 1165° C. |
| Density at 25° C. | 2,340 Kgs/m³ |

The glass drop drops into the unsplit mold which is already rotating about its longitudinal axis 16 its nominal speed (50000 U/min), as indicated by reference numeral 28. The syringe barrel assumes its desired nominal shape already after 3 seconds.

After removal from the mold and after having cooled down, the syringe barrel so produced is cut off at the outer end of the cone in order to open up the cone channel 26.

The wall thickness tolerance in the cylindrical portion 20 is within the geometric specifications and is equal to ±0.2 mm, preferably <±0.1 mm.

What is claimed is:

1. A process of producing a container from glass, comprising the steps of:
   melting a Type I glass in a melting unit;
   placing a mold underneath said melting unit;
   driving said mold rotatingly at a speed of at least 5000 rpm;
   controlling temperature of the glass to be at least 1600° C. so that viscosity is smaller than $10^3$ dPas; and
   dispensing a glass drop from said melting unit with said viscosity into said mold;
   wherein said container is formed by centrifugal force, while said mold is rotatingly driven at said speed.

2. The process of claim 1, wherein said mold is driven at a speed of at least 40000 rpm.

3. The process of claim 1, wherein said viscosity is controlled to be smaller than $10^2$ dPas.

4. The process of claim 1, wherein the container is configured as a hollow body for pharmaceutical or medical purposes, said container being open on both ends and having a shape selected from the group consisting of a cylinder barrel and a carpoule.

5. The process of claim 1, wherein the glass drop is drawn into said mold assisted by a vacuum.

6. The process of claim 1, wherein an unsplit mold is used whose wall, in a substantially cylindrical portion thereof, is inclined by less than 5 μm per 1 mm of its length relative to an axis of rotation.

7. The process of claim 1, wherein a mold is used that has a cylindrical wall.

8. The process of claim 1, wherein no lubricant is applied between the glass and the mold.

9. The process of claim 1, wherein the mold is cooled locally.

10. The process of claim 1, wherein the container is produced with a flange that is open toward the outside on its one end, and with a cone on its other end.

11. The process of claim 10, wherein the container is produced with a full-length cone channel in its cone.

12. The process of claim 11 wherein after cooling down of the container the cone is cut off at its outer end in order to open up the cone channel.

13. A process of producing a container from glass, comprising the steps of:
   melting a Type I glass in a melting unit;
   placing a mold underneath said melting unit;
   controlling temperature of the glass so that viscosity is smaller than $10^3$ dPas; and
   dispensing a glass drop from said melting unit with said viscosity into said mold;
   wherein said container is formed by centrifugal force, while said mold is rotatingly driven a speed of at least 5000 rpm.

14. A container made from a Type I glass in the shape of a hollow body open on both ends, said container comprising a cylindrical area having a wall thickness tolerance of maximally ±0.2 mm, where the boron content of the container, at all its surfaces, drops by less than 60%, relative to a nominal boron content value.

15. The container of claim 14, wherein the sodium content of the container drops at all surfaces by less than 30% relative to a nominal sodium content value.

16. The container of claim 14, having a flange at its one end and, on its other end, a cone area of smaller diameter, compared with the diameter of the medium cylindrical portion.

17. The container of claim 14, having a total glass mass of maximally 15 g.

18. The container of claim 14, having a volume of maximally 15 ml.

19. The container of claim 14, having an overall height and an overall diameter, the overall height being equal to at least 1.5 times the value of the overall diameter.

20. The container of claim 14, having a wall thickness in a cylindrical area thereof that is <1.5 mm.

* * * * *